Figure 1:
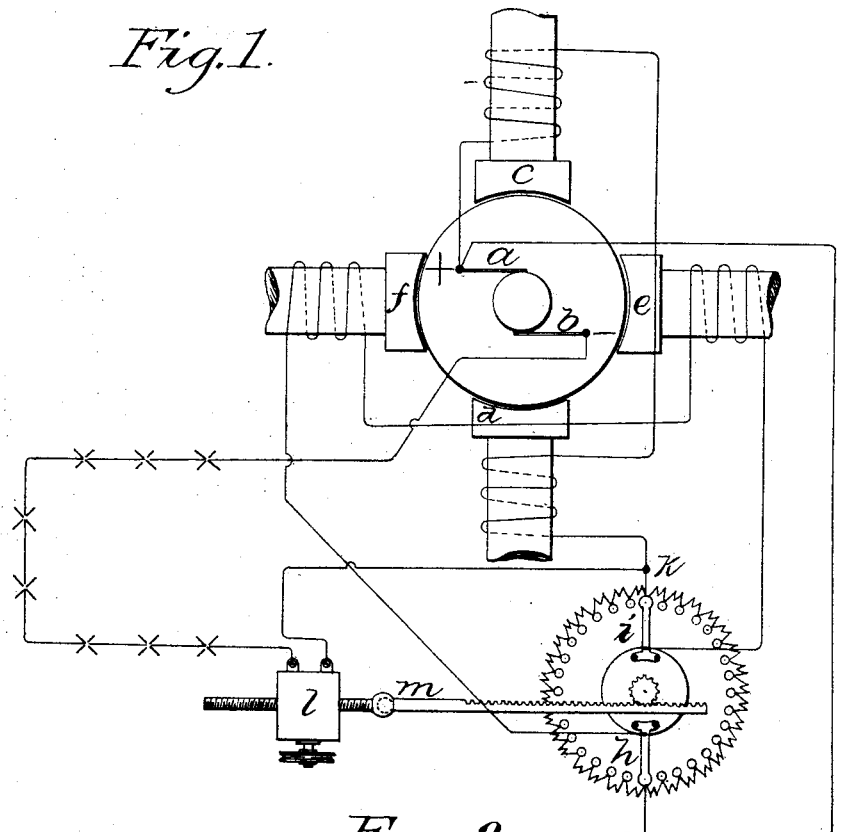

(No Model.)

C. D. HASKINS.
CONSTRUCTION AND REGULATION OF DYNAMO ELECTRIC MACHINES.

No. 535,796. Patented Mar. 12, 1895.

Witnesses.
George S. Buell.
Harriet G. Pumpleton.

Inventor.
Charles D. Haskins.
By Britton & Brown
Attorneys

UNITED STATES PATENT OFFICE.

CHARLES DARWIN HASKINS, OF BROOKLYN, NEW YORK, ASSIGNOR TO THE WESTERN ELECTRIC COMPANY, OF CHICAGO, ILLINOIS.

CONSTRUCTION AND REGULATION OF DYNAMO-ELECTRIC MACHINES.

SPECIFICATION forming part of Letters Patent No. 535,796, dated March 12, 1895.

Application filed August 6, 1894. Serial No. 519,567. (No model.)

*To all whom it may concern:*

Be it known that I, CHARLES DARWIN HASKINS, a citizen of the United States, residing at Brooklyn, in the county of Kings and State of New York, have invented a certain new and useful Improvement in the Construction and Regulation of Dynamo-Electric Machines, (Case No. 13,) of which the following is a full, clear, concise, and exact description, reference being had to the accompanying drawings, forming a part of this specification.

My invention relates more particularly to dynamo electric machines of the class generally referred to as of the constant current type. Such machines are usually series wound, that is, the field magnet coils are included in the circuit of the machine in series with the working circuit. Such machines have been heretofore regulated by varying the electromotive force to maintain the current at its normal or predetermined value as nearly as possible under changes in load or circuit resistance. Such regulation has been effected by controlling the speed, as shown in the patent to Sawyer and Man, No. 205,305, dated June 25, 1878, by varying the strength of the current traversing the coils of the field magnet, as shown in the patent to Charles F. Brush, No. 224,511, dated February 17, 1880, or by shifting the brushes, as shown in the Patent No. 228,543, granted Hiram S. Maxim, June 8, 1880. In Letters Patent to Elihu Thomson, No. 376,120, dated January 10, 1888, for dynamo electric machine or motor, is described a machine which is intended to be self-regulating without shifting the brushes. The said Thomson machine is adapted to regulate the current only for moderate variations in the load, and, though making use of sets of field magnet poles having their coils in multiple arc, owing to the fact that the excitation of the field of force does not vary in direct proportion to the current traversing its coils, even within its moderate range of movement, the said machine cannot operate with that accuracy which is found desirable, if not necessary, in practice. It has also been proposed to provide a dynamo machine with two sets of field poles and place the coils thereof in series, the current being varied as to strength and direction through the coils of one of the sets of field magnet poles for current regulation. A rheostat and a commutator connected with a shunt around the coils of one of the said sets of field magnet poles was employed for this purpose.

My invention, speaking generally, consists in a dynamo machine having two pairs of field or force poles, the coils of these pairs of field poles being connected in multiple arc with one another and combined with a rheostat and switching apparatus adapted to control the current in one of the multiple paths as to strength or direction, or as to both strength and direction, whereby one set of the pole pieces may be gradually diminished in strength and finally reversed as to polarity and increased so as to partially or completely neutralize the magnetizing effect of the other set of pole pieces. The brushes ordinarily will be maintained at the same position upon the machine, though this is not essential, since the machine is of such construction that the brushes may be set at any suitable position about the commutator. Starting, for example, at the positive brush, the circuit divides, one branch passing through the helices of one set of the pole pieces and thence to the exterior circuit and thence back to the other brush, that is to say, the negative brush. The other branch from the positive brush passes to the rheostat and thence through the switching device of the rheostat, and thence through the helices of the other set of pole pieces and back to another connection of the switching device of the rheostat, and thence to the exterior circuit, and thence back to the negative brush. The limbs of the multiple arc circuit thus separate at the positive brush and come together at the terminal of the exterior circuit next to the rheostat. In one side or limb of this multiple arc circuit are included one after another the helices of one of the sets of pole pieces. In the other limb or branch of the multiple arc circuit are included one after the other the helices of the other set of pole pieces, and in addition, the rheostat and the switching device or commutator thereof are placed and connected in position to change the resistance of this branch and the polarity of the current flowing therein in accordance with the work which is being performed in the exterior circuit.

By means of the rheostat and switching device I am enabled to gradually reduce the current in the field coils included in the parallel circuit with which it is connected from its maximum strength down to zero, and I am enabled also to gradually build up a current in said coils in the opposite direction starting at zero and increasing the current to its maximum. In this manner one set of pole pieces may be first weakened until they become neutral and then gradually built up of an opposite polarity, first to oppose and finally to completely neutralize, if desired, the magnetic effect of the other set of poles. This method of accurately controlling the magnetic field to maintain the current constant under changes of load or circuit resistance in the exterior circuit by means of different sets of symmetrically arranged sets of pole pieces placed in multiple arc, and mechanism whereby the current through the helices of one set is governed as to strength or polarity, or as to both strength and polarity constitutes one of the essential features of my present invention.

My invention may be realized in connection with a rheostat having a commutator adapted to be operated by hand, the switch of the commutator being turned in one direction or the other in accordance with the fluctuations observed in the strength of the main current. A commutator for the rheostat having a switch adapted to be moved or controlled by the action of a magnet responding to changes in the main current I consider preferable to manual adjustment, since by such automatic control the attendant is relieved from the necessity of watching the ammeter or other current indicator.

My invention will be more readily understood by reference to the accompanying drawings, in which—

Figure 2:
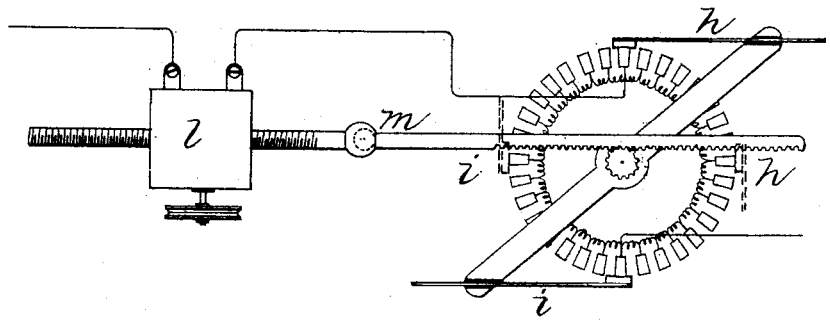

Figure 1 is a diagram illustrative of circuits and apparatus embodying my invention. Fig. 2 is a diagram illustrative of the rheostat, its commutator and the automatic switch controller, the full lines indicating the position of the commutator contact arms $h$ and $i$ when the machine is running on short circuit, and the dotted lines indicating their positions when running at half load.

Like parts are indicated by similar letters of reference throughout the different figures.

As shown in Fig. 1, the dynamo machine is provided with brushes $a$ and $b$ resting upon the commutator thereof. I will assume that the brush $a$ is the + or positive brush, and brush $b$ the − or negative brush. The machine is shown provided with two sets of field poles. Each set in this instance consists of only two poles, that is to say, the north pole $c$ and the south pole $d$ constitute the members of one set of pole pieces, while the other set consists of the poles $e$ and $f$ which are symmetrical with respect to the other set $c\,d$, that is to say, the different sets of pole pieces are so arranged that both sets may unite to increase the excitation of the field of force as is required when the machine is supplying its maximum electromotive force, but when the current through the coils or helices of one set is reversed the magnetizing effects of the two sets will be opposed to one another and thus produce a field of only such force as will be suitable when the machine is running on short circuit.

My experiments indicate that two sets of pole pieces, each set consisting of two members, as illustrated in my drawings, will be found most desirable. It is evident, however, that the number of sets and the disposition of the members of each set might be varied, provided such a symmetrical arrangement as to position and magnetic effect as I have indicated shall be observed.

Starting from the + brush $a$, one branch of the multiple arc circuit passes through the helix of magnet $c$ and thence through the helix of magnet $d$ and thence through the exterior circuit and to the − brush $b$. The other branch from the + brush $a$ passes first to connecting terminal $g$ of the rheostat and thence the circuit may be traced to the contact arm $h$ of the rheostat commutator, and thence through the helix of field magnet $f$ and thence through the helix of field magnet $e$ and thence to the contact arm $i$ of the rheostat commutator, and thence to the connecting terminal $k$, and thence to line. It will be observed that the two branches starting from the + brush $a$ are united at the connecting terminal $k$; the two branches or limbs of the circuit included between the said brush $a$ and the connecting terminal $k$ constitute the multiple arc circuit, in one side of which are included the coil s of the set of field magnets $c\,d$, while in the other side or limb of said multiple arc circuit are included the rheostat and its connections, together with the coils of the other set of field magnets $e\,f$.

As shown in Fig. 1 the machine is assumed to be running at full load. Under these conditions, assuming that the resistance of the two branches of the multiple arc circuit is about the same, the two sets of magnets will act with about equal effect and aid one another in producing a magnetic field for the armature of the machine, that is, under the conditions assumed, the field will be at its maximum strength and the armature revolving in that field at a given rate of speed will produce the maximum electromotive force such as required when the machine is furnishing electrical energy for full load. The pole pieces $c$ $e$ will be excited N while the pole pieces $f$ $d$ will be excited S.

I contemplate a constant resistance and a current of a given direction through the branch including the coils of the set of field pole pieces $c\,d$. I contemplate reducing the excitation of the field pole pieces $e$ and $f$ by decreasing the current flowing through their coils, this being done as the load is diminished. I further contemplate reversing the polarity of the current in these same coils and then gradually increase it in volume therein until the magnetic strength of a reversed polarity of the field pole pieces $e$ and $f$ shall equal in amount the magnetic moment of the other set $c$ $d$.

Any change of resistance in one or both of the multiple branches, or any reversal of polarity by my method, or by means substantially such as I have shown, it is evident will realize my invention.

The controller magnet $l$ of the device for automatically operating the switch or commutator of the rheostat is preferably placed in the main circuit to respond to variations therein, and by such response to control a motor adapted to rotate the contact arms $h$ $i$ over the rheostat contacts of contact arm $h$ and over the rheostat contacts of arm $i$ in the proper direction. I have employed the regulating mechanism shown in Patent No. 435,526, dated September 2, 1890, for doing this work. When the current through magnet $l$ is increased above the normal, as by cutting out lamps, the rod $m$ will be thrust out in a direction to move arm $h$ from the rheostat contacts to include one or more of the resistance coils of the rheostat in the circuit of the coils of field magnets $e$ $f$. The movement will continue until the current through this branch of the multiple arc circuit is reduced sufficiently so that the field will be only of the force required to produce the normal current, and then the movement will cease. When arm $h$ is moved to the position indicated by dotted lines in Fig. 2, field magnet poles $e$ $f$ will become neutral since there will be no difference of electrical potential between contact arms $h$ and $i$. Suppose more lamps are then removed from the circuit, the rod $m$ will be thrust farther out and the contact arms $h$ and $i$ will be brought into electrical connection with that portion of the rheostat which will provide a difference of electrical potential of opposite polarity. Thus the current through the coils of field magnets $e$ $f$ will be reversed and their force will be exerted in opposition to the force of magnets $c$ $d$. As more lamps are removed a still greater difference in potential will occur between arms $h$ and $i$, and the current through coils of field magnets $e$ and $f$ increases until the current may be equal to the current through the other branch of the multiple arc circuit. The two sets of field magnet poles then being of approximately equal force and opposing one another will produce a field in which the armature rotating will generate the minimum electromotive force, that is, only the amount desired when the machine is short-circuited or running without any load. Assume now that the machine were initially started at short circuit, it is evident that as lamps were added the magnet $l$ would respond to the current as diminished when lamps were added, and that the commutator of the rheostat would be moved to the position indicated by the full lines in Fig. 1. Throughout all the changes of load and circuit resistance resulting, the supply of electricity, that is the amount of electrical energy, is regulated at the source of supply in accordance with the work to be performed.

Having thus described my invention, I claim as new and desire to secure by Letters Patent—

1. The combination in a dynamo electric machine, of symmetrical sets of field pole pieces, the different sets being connected in multiple arc, and a rheostat placed in connection with one of the limbs of the multiple arc circuit and adapted to vary the current flowing through the helices therein, substantially as described.

2. The combination with a dynamo electric machine, of the external circuit with arc lamps or other translating devices included therein, the field of force magnets consisting of two symmetrical sets, the different sets being placed in multiple arc, and means for varying the current flowing in the coils of one of the sets of the field magnets, and hence the magnetic strength of said field magnets to control the electrical output of the machine in accordance with the load, substantially as described.

3. In a dynamo electric machine, two pairs or sets of field magnet poles connected in parallel circuit and adapted to act in the same direction upon the field of force while current is passing through the coils of the two sets in the same direction, and a switching device for reversing the polarity of the current through one of said sets and gradually increasing the current thus reversed to cause the two sets of magnets to act in opposition to one another to reduce the strength of the field of force, substantially as described.

In witness whereof I hereunto subscribe my name this 18th day of July, A. D. 1894.

CHARLES DARWIN HASKINS.

Witnesses:
GEORGE P. BARTON,
GEORGE L. CRAGG.